(12) United States Patent
Hakemi et al.

(10) Patent No.: US 11,768,430 B2
(45) Date of Patent: Sep. 26, 2023

(54) ADVANCED POLYMER DISPERSED LIQUID CRYSTAL (PDLC) FOR DISPLAY PROJECTION SCREENS

(71) Applicant: GAUZY LTD, Tel-Aviv (IL)

(72) Inventors: Hassan-Ali Hakemi, Macherio (IT); Adrian Lofer, Kfar Saba (IL); Eyal Peso, Bat Yam (IL); Dana Gal-Fuss, Tel Aviv (IL); Koby Kfir, Yavne (IL)

(73) Assignee: GAUZY LTD., Tel-Aviv (IL)

( * ) Notice: Subject to any disclaimer, the term of this patent is extended or adjusted under 35 U.S.C. 154(b) by 0 days.

(21) Appl. No.: 15/740,672

(22) PCT Filed: Jun. 30, 2016

(86) PCT No.: PCT/IL2016/050704
§ 371 (c)(1),
(2) Date: Dec. 28, 2017

(87) PCT Pub. No.: WO2017/002122
PCT Pub. Date: Jan. 5, 2017

(65) Prior Publication Data
US 2018/0321578 A1    Nov. 8, 2018

Related U.S. Application Data

(60) Provisional application No. 62/186,414, filed on Jun. 30, 2015.

(51) Int. Cl.
*G03B 21/62*     (2014.01)
*G03B 21/56*     (2006.01)
*G02F 1/1334*    (2006.01)

(52) U.S. Cl.
CPC ........... *G03B 21/62* (2013.01); *G02F 1/1334* (2013.01); *G03B 21/56* (2013.01)

(58) Field of Classification Search
CPC .... G03B 21/567; G03B 21/604; G02F 1/1334
See application file for complete search history.

(56) References Cited

U.S. PATENT DOCUMENTS

| 4,432,610 A | * | 2/1984 | Kobayashi | ........... G09G 3/3648 349/114 |
| 5,416,617 A | | 5/1995 | Loiseaux et al. | |

(Continued)

FOREIGN PATENT DOCUMENTS

| CN | 103543550 A | | 1/2014 | |
| EP | 769544 A1 | * | 4/1997 | ........... C09K 19/544 |
| EP | 2176377 A1 | | 4/2010 | |

OTHER PUBLICATIONS

International Search Report of PCT/IL16/50704 Completed Dec. 21, 2016; dated Jan. 13, 2017 1 page.

(Continued)

*Primary Examiner* — Christopher E Mahoney
(74) *Attorney, Agent, or Firm* — The Roy Gross Law Firm, LLC; Roy Gross

(57) ABSTRACT

An active or passive PDLC projection screen comprising: at least two transparent metalized or non-metalized polymer supports; at least one layer of liquid crystal dispersions located between said at least two transparent metalized polymer supports; electrical components to control the behavior of said PDLC projection screen; wherein said PDLC projection screen have a total light transmittance $T_t$ of about 70 to 90%, a diffusion transmittance $D_t$ of about 0 to 10%, a clarity C of 90 to 97% and a haze value H of about 0 to 3%, measured in accordance with either ASTM D 1003-13, ISO 13468-1:1996 or ISO 13468-2:1999; further wherein said PDLC projection screen is manufactured by methods of release sheets support.

21 Claims, 5 Drawing Sheets

(56) References Cited

U.S. PATENT DOCUMENTS

| | | | |
|---|---|---|---|
| 5,546,202 A | | 8/1996 | Ansley |
| 5,784,138 A | | 7/1998 | Kollarits |
| 5,826,961 A | | 10/1998 | Kim et al. |
| 5,889,614 A | | 3/1999 | Cobben et al. |
| 6,144,353 A | * | 11/2000 | McKnight ............ G09G 3/2011 345/208 |
| 6,243,152 B1 | | 6/2001 | Knox et al. |
| 6,483,643 B1 | | 11/2002 | Zuchowski |
| 6,538,814 B2 | | 3/2003 | Hunter et al. |
| 6,814,443 B2 | | 11/2004 | Safran et al. |
| 7,119,859 B2 | * | 10/2006 | Chari ................ G02F 1/13718 349/88 |
| 7,377,652 B2 | | 5/2008 | Whitehead et al. |
| 7,583,423 B2 | | 9/2009 | Sutherland et al. |
| 8,508,695 B2 | * | 8/2013 | O'Keeffe ............ C09K 19/544 349/168 |
| 2005/0195354 A1 | | 9/2005 | Doane et al. |
| 2006/0159864 A1 | | 7/2006 | Natarajan et al. |
| 2008/0316395 A1 | | 12/2008 | O'Keeffe |
| 2010/0045924 A1 | | 2/2010 | Powers et al. |
| 2010/0202725 A1 | * | 8/2010 | Popovich ............ G02B 6/005 385/10 |
| 2010/0302487 A1 | | 12/2010 | Storer et al. |
| 2011/0080553 A1 | * | 4/2011 | Sun ........................ C09K 19/52 349/201 |
| 2012/0140147 A1 | * | 6/2012 | Satoh .................... G02F 1/1334 349/62 |
| 2013/0083090 A1 | * | 4/2013 | Yamauchi ............ G03B 21/56 345/690 |
| 2014/0016042 A1 | | 1/2014 | Yamauchi |
| 2014/0078410 A1 | | 3/2014 | Wang |
| 2014/0132909 A1 | | 5/2014 | Wardhana et al. |

OTHER PUBLICATIONS

Written Opinion of PCT/IL16/50704 Completed Dec. 21, 2016; dated Jan. 13, 2017 4 pages.

IPRP of PCT/IL16/50704 Completed Jan. 2, 2018 5 pages.

ISO: International Organization for Standardization (1999) ISO 13468-2. Plastics—Determination of the total luminous transmittance of transparent materials—Part 2: Double-beam instrument.

ASTM International. Designation: D1003-13: Standard test method for haze and luminous transmittance of transparent plastics. Available online at: https://www.astm.org/d1003-13.html.

Byk-Gardner Gmbh et al. (2010). Transmission Haze Available online at: https://wiki unece org/display/trans/IPG-TF +wiper-SG2-02?preview=%2F5800573%2F6160618%2FIGPG-TF+wiper-SG2-02-01e.pdf.

Wikipedia, Haze (optics). Available online at: https://en.wikipedia.org/wiki/Haze_(optics)#Measurement_2.

ISO: International Organization for Standardization (1996) ISO 13468-1. Plastics—Determination of the total luminous transmittance of transparent materials—Part 1: Single-beam instrument.

Extended European Search Report for European Patent Application No. 22176795.7, dated Sep. 29, 2022, 9pp.

* cited by examiner

Single-Release PDLC for Passive and Active Projection Screen

Double-Release PDLC for passive and Active Projection Screen

ADVANCED POLYMER DISPERSED LIQUID CRYSTAL (PDLC) FOR DISPLAY PROJECTION SCREENS

RELATED APPLICATIONS

This application is a National Phase of PCT Patent Application No. PCT/IL2016/050704 having International filing date of Jun. 30, 2016, which claims the benefit of priority of U.S. Provisional Application No. 62/186,414 filed on Jun. 30, 2015 entitled ADVANCED POLYMER DISPERSED LIQUID CRYSTAL (PDLC) FOR A DISPLAY PROJECTION SCREENS. The contents of the above applications are all incorporated by reference as if fully set forth herein in their entirety.

TECHNICAL FIELD

The present invention relates to PDLC and specifically to PDLC for use as display projection screen.

BACKGROUND

PDLC as screens for projected images have being around a long time due to exceptional image quality of PDLC due to birefringent LC micro-droplets, most producers of commercial PDLC film are also selling it for integrated use of privacy-projection applications. The quality of these systems depends on several aspects, some of them are: the quality of the projector, the quality of the PDLC, the morphology of the PDLC, the ambient lighting conditions and others.

Some of the most prevalent reasons that caused the slow penetration of PDLC as screen projection devices are the high cost of production of PDLC in relation with the performance of the same as projection screen devices. Also, mainly due to price and its commercial availability of the Active (switchable) mode. More than 80% of potential PDLC film for RPS market is for Passive mode.

Some examples of prior art in this field are:

U.S. Pat. No. 5,784,138A discloses a fast transition polymer dispersed liquid crystal shutter for use in the display screen of a teleconferencing system. The shutter capable of assuming alternative transparent and scattering states and a method of manufacture therefor. In one embodiment, the shutter includes a film of a polymer-dispersed liquid crystal (PDLC) composition of a polymer and a liquid crystal material wherein the liquid crystal material makes up about 78% by weight of the film. The film is cured at a temperature ranging from about 32° C. to about 38° C., thereby decreasing the time it takes for the film to switch between the transparent and scattering states. The shutter further includes first and second layers of a transparent conductor for containing the film there between and driver circuitry, coupled to the film, for causing the film to have a response time equal to or less than 8 ms.

U.S. Pat. No. 5,889,614A discloses a presentation system comprising an image projection screen and an overhead projector. The overhead projector comprises an illumination system, a support for supporting an image record carrier and a projection head for projecting the image present in the image record carrier on the image projection screen. The image projection screen is a polarizing screen which transmits radiation having a well-defined direction of transmission polarization, and the overhead projector is adapted to supply light having this direction of polarization. In this way, the quantity of radiation used for forming the image is considerably increased and substantially half the quantity of ambient light incident on the screen is suppressed, so that images having a considerably enhanced contrast and brightness are obtained.

U.S. Pat. No. 5,416,617A discloses a diffusing display screen resulting from the combination of a cell comprising a polymer dispersed liquid crystal material which can be made diffusing, and of a cell comprising an electrochromic material which can be made absorbing and reflecting. Outside the operating mode, the display screen according to the invention has the advantage of being transparent, and thus capable of being fixed onto any surface (window, wall, etc.).

U.S. Pat. No. 5,546,202A discloses in a display system suitable for high ambient light environments, a lamp is used simply as a light source to illuminate a rear projection display screen, which is a matrix of tiny cells that modulate the light at video rates. Each cell includes a polymer dispersed liquid crystal (PDLC), a focusing lens and a pinhole aperture. When the PDLC is electrically activated, light passing through the PDLC is scattered in many directions, and very little light passes through the pinhole aperture and is seen by the viewer. When the PDLC is not electrically activated, light passing through the PDLC is not scattered, the lens of each cell focuses the light through the pinhole aperture, and the viewer sees a bright spot of light.

U.S. Pat. No. 5,826,961A discloses a rear projector employing an image display uses a polymer dispersion liquid crystal (PDLC) panel which suppresses a turbulent reflection due to a high light refractive index. Accordingly, a slim appearance is attained since a light separating/synthesizing system is eliminated, and the resolution and brightness of the image is improved by precisely and easily controlling the change of the light pathway.

U.S. Pat. No. 6,243,152B1 discloses a polymer dispersed liquid crystal projection display is provided that has enhanced contrast. In the projection system using a polymer dispersed liquid crystal display (PDLC), polarized light is used as the light source onto the PDLC. The reflected light maintains its polarization, while the scattered light from the off pixels of the PDLC randomize the polarization. The polarized image is then passed through a polarizing filter which eliminates half of the scattered light, whereas practically all of the polarized image is passed onto the display source. In this way, the contrast between the on and off pixels is effectively doubled.

U.S. Pat. No. 6,483,643B1 discloses a light scatter control in rear projection and front projection of light images focused upon a screen having a liquid crystal droplet film, and modulated light gain control of single and multi-panel screens is provided, without size restriction, maximizing light transmission and reflection, for brilliant high resolution viewing of cinema and video regardless of high degree of ambient light. Panels of liquid crystal film lamina and associated laminates are joined by imperceptible optical splicing.

U.S. Pat. No. 6,538,814B2 discloses an active screen reflects a high contrast projected image. The screen has (1) an active layer having visible optical properties changed by an electric field provided by electrodes and (2) a photosensitive layer. The photosensitive layer is such that the electric field across a localized area of the active layer depends on the illumination incident on the photoconductor in that area. The local reflectance of the projection screen thus depends on the intensity of light incident upon it. In one embodiment, the reflectance of the screen increases with increasing light intensity to produce a high contrast reflected image.

U.S. Pat. No. 6,814,443B2 discloses a projection system for the display of images in a wide range of ambient light conditions. The system comprises a system control component, two or more projectors and a screen unit. The system control component synchronizes two or more images for projection by the projectors, with the image synchronization enabling the generation of a coherent single image from multiple projected images. There are two or more projectors which project separate images and each projector projects an image onto a unique area of a screen unit. The synchronization of the projectors is also controlled by the system control component. The screen unit has one or more screens for receiving the projected images and these screens are compatible with a rear projection system. The screens incorporate a contrast enhancing component which improves the resistance of the projected image to contrast degradation due to a wide range of ambient light conditions.

U.S. Pat. No. 7,377,652B2 discloses a display has a screen which incorporates a light modulator. The screen may be a front projection screen or a rear-projection screen. Elements of the light modulator may be controlled to adjust the intensity of light emanating from corresponding areas on the screen. The display may provide a high dynamic range.

US20140078410A1 discloses a window apparatus comprises a first layer including a liquid crystal microdroplet (LCMD) display switchable between transparent and opaque states in response to a change in an applied electrical voltage and a second layer coupled to the first layer. The second layer is changeable between a light transmitting configuration and a light blocking configuration.

US20140132909A1 discloses a transparent display that includes a display screen. The display screen includes a first film that includes a first transparent conductor disposed upon a first transparent substrate and a second film that includes a second transparent conductor disposed upon a second transparent substrate. A first polymeric liquid crystal composition containing spacer beads is disposed between the first film and the second film. At least one of the first transparent conductor and the second transparent conductor is shaped, or at least one of the first transparent conductor and the second transparent conductor is patterned. Also, disclosed is a display system that includes the disclosed display screen and an illumination device for projecting light onto or through the display screen. Finally, a method of constructing a display screen is also disclosed.

Even in today's advancements in technology, the relation between PDLC physical/optical properties and image quality are poor understood, mainly because of lack of R&D strategy, resources and business interest in a market different than privacy glass, all PDLC film producers are promoting the projection application as a secondary application of their privacy film.

The aforementioned prior art have something in common. They all try to meliorate the quality of the screened image on the PDLC screen. They try to use very complex and cumbersome solutions in order to enhance the perceived quality of the image on the PDLC screen. But none is concentrating their efforts to upgrade the quality of the PDLC.

Therefore, there is a long felt need to provide a high quality image, simple, low cost and technological PDLC as means to screen any kind of image at any lighting condition. Between these, Passive PDLC screens for majority RPS and FPS markets, as well as active PDLC for high-end niche markets.

SUMMARY OF THE INVENTION

It is hence one object of the invention to disclose a PDLC projection screen comprising: at least two transparent metalized polymer supports; at least one layer of liquid crystal dispersions located between said at least two transparent polymer supports; electrical components to control the behavior of said PDLC projection screen; wherein said PDLC projection screen have a total light transmittance $T_t$ of about 70 to 90%, a diffusion transmittance $D_t$ of about 0 to 10%, a clarity C of 90 to 97% and a haze value H of about 0 to 3%, measured in accordance with either ASTM D1003-13, ISO 13468-1:1996 or ISO 13468-2:1999; further wherein said PDLC projection screen is manufactured by methods of release sheets support.

A further object of the invention is to disclose the PDLC projection screen wherein said PDLC projection screen is used in active or passive screening methods.

A further object of the invention is to disclose the PDLC projection screen wherein said PDLC projection screen is used in frontal or rear screening methods.

A further object of the invention is to disclose the PDLC projection screen wherein said at least two transparent polymer supports are metalized coated and used for active screening methods.

A further object of the invention is to disclose the PDLC projection screen wherein said at least two transparent polymer supports are non-metalized coated and used for passive screening methods.

A further object of the invention is to disclose the PDLC projection screen wherein said PDLC morphology is selected from a group consisting of mono-dispersed, random, gradient poly-dispersed liquid crystal (LC) morphologies and any combination thereof.

A further object of the invention is to disclose the PDLC projection screen wherein said PDLC film consist of droplets selected from a group consisting of nano-droplets, micro-droplets, macro-droplets liquid crystal inclusions dispersed in a polymer matrix and any combination thereof.

A further object of the invention is to disclose the PDLC projection screen, wherein said PDLC film is sandwiched between metalized polymer supports selected from a group consisting of flexible, rigid and any combination thereof.

A further object of the invention is to disclose the PDLC projection screen wherein said flexible non-metalized supports are PET.

A further object of the invention is to disclose the PDLC projection screen wherein said rigid metalized supports are polycarbonate, Plexiglas or glass.

A further object of the invention is to disclose the PDLC projection screen wherein said metalized polymer supports are not metallized for passive PDLC projection screen.

A further object of the invention is to disclose the PDLC projection screen wherein said PDLC thickness is between 10-100 microns.

A further object of the invention is to disclose the PDLC projection screen wherein said PDLC projection screen comprise at least one PDLC layers with different droplet morphologies.

A further object of the invention is to disclose the PDLC projection screen wherein said PDLC is made by methods selected from a group consisting of UV-curable, thermoset, thermoplastic phase separation and any combination thereof.

A further object of the invention is to disclose the PDLC projection screen wherein said PDLC is made by micro-emulsion methods.

A further object of the invention is to disclose the PDLC projection screen wherein said PDLC projection screen can be a stand-alone device or retrofitted into an already existing surface.

A further object of the invention is to disclose the PDLC projection screen wherein said PDLC projection screen is connected to a power dimmer apparatus operative to provide AC current to said PDLC projection screen to generate a set of transparency states between opaque and full transparent.

It is hence another object of the invention to disclose a method for manufacturing a PDLC projection screen, comprising the steps of: providing materials for producing a PDLC, LCDP, PSLC or polymer network film, comprising: at least two transparent metalized polymer supports; and at least one liquid crystal dispersion; allocating said liquid crystal dispersion between said at least two transparent polymer supports, thereby forming a PDLC, LCDP, PSLC or polymer network film; curing said PDLC, LCDP, PSLC or polymer network film by means of UV light, electron beam light or heat; controlling the quality parameters of said PDLC projection screen; wherein said step of controlling said PDLC projection screen further comprises a step of verifying that said quality parameters are equal to: a total light transmittance $T_t$ of about 70 to 90%, a diffusion transmittance $D_t$ of about 0 to 10%, a clarity C of 90 to 97% and a haze value H of about 0 to 3%, measured in accordance with either ASTM D1003-13, ISO 13468-1:1996 or ISO 13468-2:1999.

A further object of the invention is to disclose the method wherein in said step of providing materials said at least two transparent polymer supports are metalized coated and used for active screening methods.

A further object of the invention is to disclose the method wherein in said step of providing materials said at least two transparent polymer supports are non-metalized coated and used for passive screening methods.

A further object of the invention is to disclose the method further comprising the step of retrofitting said PDLC, LCDP, PSLC or polymer network film into an already existing surface.

It is hence another object of the invention to disclose a method for manufacturing a multilayer of liquid crystal dispersion in a polymer matrix film adapted for a PDLC projection screen, comprising the steps of: providing materials for producing a PDLC, LCDP, PSLC or polymer network film, comprising: at least one first releasable supporting film; at least one liquid crystal dispersion; at least one second supporting film; allocating said liquid crystal dispersion between said at least one first releasable supporting film and said at least one second supporting film, thereby forming a PDLC, LCDP, PSLC or polymer network film; curing said PDLC, LCDP, PSLC or polymer network film by means of UV light, electron beam light or heat; detaching said at least one releasable supporting film; providing materials for producing at least one second layer of liquid crystal in said PDLC, LCDP, PSLC or polymer network film, comprising: a third supporting film; a second liquid crystal dispersion; allocating said second liquid crystal dispersion between said third supporting film and said PDLC film, thereby forming a multilayer PDLC film; curing said multilayer PDLC, LCDP, PSLC or polymer network film by means of UV or electron beam light; controlling the quality parameters of said PDLC projection screen; wherein any of said supporting films can be releasable supporting films; further wherein said step of controlling said PDLC projection screen further comprises a step of verifying that said quality parameters are equal to: a total light transmittance $T_t$ of about 70 to 90%, a diffusion transmittance $D_t$ of about 0 to 10%, a clarity C of 90 to 97% and a haze value H of about 0 to 3%, measured in accordance with either ASTM D1003-13, ISO 13468-1:1996 or ISO 13468-2:1999.

A further object of the invention is to disclose the method further comprising the step of retrofitting said PDLC, LCDP, PSLC or polymer network film into an already existing surface.

It is hence another object of the invention to disclose a method for presenting a projected image, comprising the steps of: acquire the PDLC projection screen as disclosed herein; acquire a projector; allocate said projector either in front or behind said PDLC projection screen; activate said projector; activate or deactivate said PDLC projection screen.

A further object of the invention is to disclose the method wherein said PDLC projection screen is connected to a power dimmer apparatus operative to provide AC current to said PDLC projection screen to generate a set of transparency states between opaque and full transparent.

A further object of the invention is to disclose the method wherein said PDLC projection screen is further connected to at least one sensor selected from group consisting of: movement sensor, temperature sensor, location sensor, humidity sensor, light sensor, and any combination thereof.

DETAIL DESCRIPTION OF THE PREFERRED EMBODIMENTS

Figure 1:
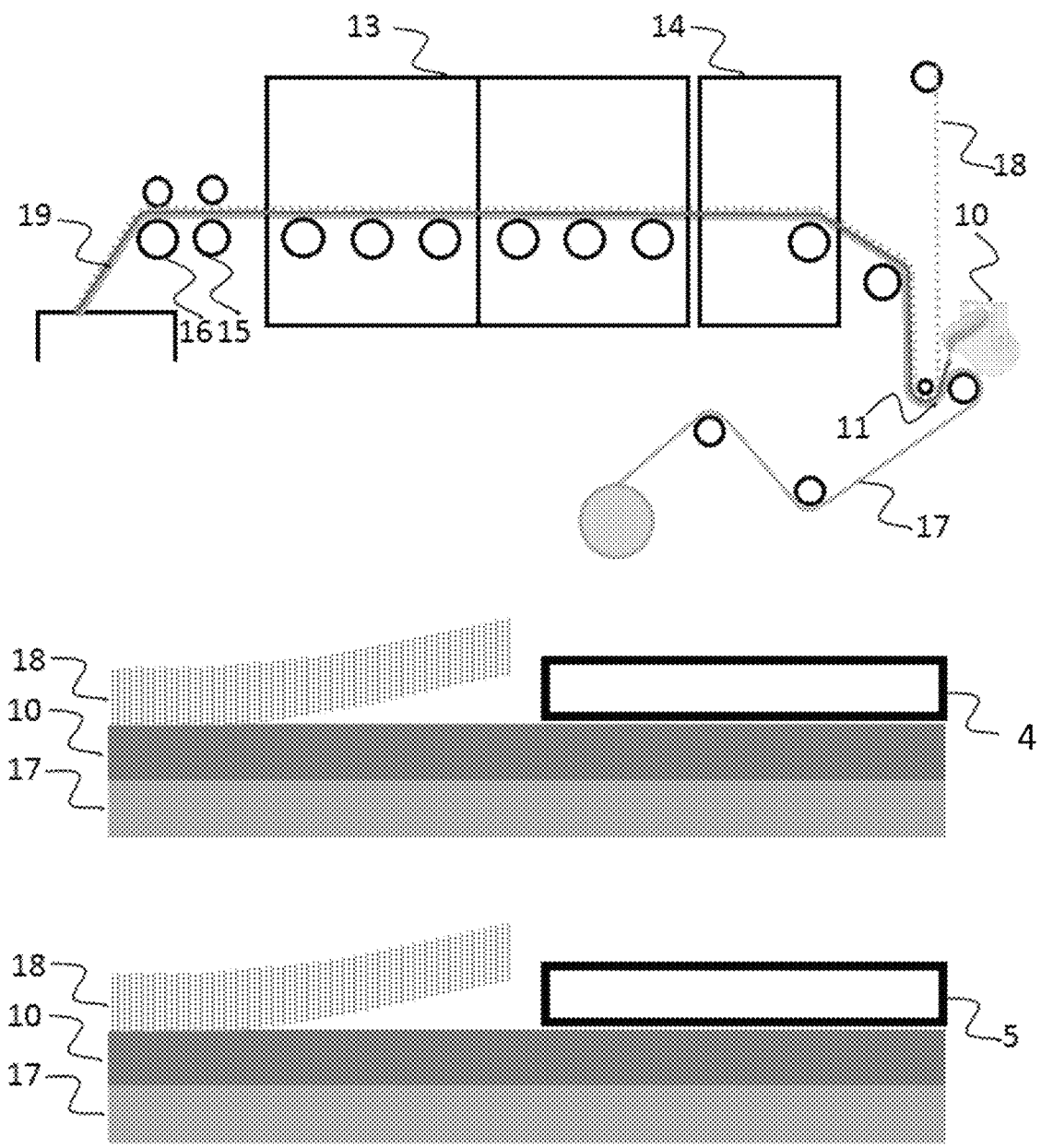
FIG. 1—showing a schematic representation of a method for manufacture the PDLC projection screen.

The following description is provided, to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a PDLC adapted to provide a high quality of image in a projection screen system. Thus, a novel method for creating such films has been obtained.

The term "haze (H)" refers hereinafter to see-through quality, and total transmittance of a material, based on how much visible light is diffused or s scattered when passing through a material. Also, the percentage of light that when passing through deviates from the incident beam greater than 2.5 degrees on average.

The term "total transmittance $(T_t)$" refers hereinafter to the measure of the total incident light compared to the light that is actually transmitted (e.g. total transmittance). So the incident light may be 100%, but because of absorption and reflection the total transmittance may only be 94%. Total Transmittance can be divided into (a) Direct Transmittance and (b) Diffuse Transmittance.

The term "direct transmittance" refers hereinafter to the portion of the light that passes through the film without being scattered or diffused by the irregularities on the surface or the interior of the film. Also referred to as the percentage of light that when passing through deviates from the incident beam up to 2.5 degrees on average.

The term "diffuse transmittance ($D_t$)" refers hereinafter to the portion of light that is scattered or diffused by these irregularities.

Diffuse Transmittance is a combination of haze and clarity, both measures of the degree of scatter.

The term "clarity (C)" refers hereinafter to the measure of narrow-angle scattering, and causes the detail of an object to be compromised when viewing it though the film. Clarity is also distance-dependent, which means that the farther the object is being viewed through the film, the worse its detail becomes.

The term Retrofit(ting) refers hereinafter to the modification of a conventional window or surface by combining the same in some manner with an enhancement, i.e., a switchable glazing, non-switchable light modulating device, etc.

The present invention is prompted by shortcomings in the application of current PDLC film technology and lack of proper penetration of exiting PDLC products in the projection screen market is based on improvement of PDLC technology and developing new passive and active high-image quality and large-area rear and front projection screens.

The present invention is based on adaptation of PDLC film technology and development of a series of novel and high-quality non-switchable and switchable rear and front projection screens with improved image qualities for various lighting conditions.

One embodiment of the present invention is to establish and quantify the structure-property relations between physical and optical properties of PDLC screen with the quality of the projected image, leading to quantitative a modeling of the device.

Another embodiment of the invention is to manufacture large-area passive and active high-quality projection screens for information, multimedia and entertainment markets.

Release Sheet

In a preferred embodiment of the present invention, a release sheet is used in the manufacturing of the PDLC screen projection. A release sheet enables the manufacturing of a PDLC and at the end of said manufacturing the sheet is removed from the PDLC without problem and without damaging the physical characteristics of said PDLC. The release sheet can be made from a variety of materials, like Polyethylene (PE) of any kind, Polypropylene (PP) of any kind, non-coated thin (e.g. 12-50 Micron) PET, and any kind of non-shrinkable plastic like Ethylene Vinyl Acetate (EVA) films. In certain embodiments, the release sheet is coated with polymers that facilitates the removal from the liquid crystal. In other embodiments, the release sheet is positively or negatively charged in order to facilitate the removal of the sheet. It will be obvious for a person skilled in the art that variations in the polymers, materials or coatings can be used for the manufacture of releasable sheets.

In one embodiment of the present invention, the PDLC screen projection can be passive or active.

In another embodiment of the present invention the passive or active PDLC screen projection is manufactured in a two-step fabrication phases.

In Phase I of the manufacturing process, a pre-form PDLC is created in order to allow flexibility when moving to Phase II of the process. The idea is to create the materials needed for Phase II, while conserving certain flexibility in the usage of the same. From different Phase I pre-form materials—different final products of Phase II can be produced.

The materials used in the Phase I can be PET, PET-ITO, PET with any other conductive or metalized coating (e.g. PET-silver), liquid crystal suspension (LC) and release films. It will be obvious to a person skilled in the art, that variations of those are also included in the scope of the present invention.

The materials used in the Phase II can be glass, polycarbonate, Plexiglas and others. All of them can be metalized coated or not.

In another embodiment of the present invention, the passive PDLC screen projection can have the following configurations depending on the respective step of the fabrication phase:

Phase I—passive possible configurations:
PET-LC-Release film
Release film-LC-Release film
PET-LC-PET
Phase II—passive possible configurations:
PET-LC-Glass
Glass-LC-Glass
Glass-(PET-LC-PET)-Glass
Glass-(PET-LC-PET) [using retrofitting techniques]

It is important to mention that in the case of passive PDLC screen projection, one of either the glass or the PET can have a metalized coating in order to enhance the quality of the image that is being screened.

The passive PDLC screen projection possible configurations can be summarized by the following table:

| PHASE I | Intermediate action | PHASE II |
|---|---|---|
| PET - LC - Release film | Remove release film and adhere glass | PET - LC - Glass |
| Release film - LC - Release film | Remove release films and adhere glasses | Glass - LC - Glass |
| PET - LC - PET | Adhere glasses | Glass - (PET - LC - PET) - Glass |
| PET - LC - PET | Adhere glass using retrofitting techniques | Glass - (PET - LC - PET) |

The methods of fabricating the PDLC Phase I with the configuration PET-LC-PET are known in the art.

In another embodiment of the present invention, the active PDLC screen projection can have the following configurations depending on the respective step of the fabrication phase:

Phase I—active possible configurations:
PET-ITO-LC-Release film
Release film-LC-Release film
PET-ITO-LC-PET-ITO
Phase II—active possible configurations:
PET-ITO-LC-Metalized coated Glass
Metalized coated Glass-LC-Metalized coated Glass
Glass-(PET-ITO-LC-PET-ITO)-Glass
Glass-(PET-ITO-LC-PET-ITO) [using retrofitting techniques]

The active PDLC screen projection possible configurations can be summarized by the following table:

| PHASE I | Intermediate action | PHASE II |
|---|---|---|
| PET-ITO - LC - Release film | Remove release film and adhere metalized coated glass | PET-ITO - LC - Metalized coated Glass |
| Release film - LC - Release film | Remove release films and adhere metalized coated glasses | Metalized coated Glass - LC - Metalized coated Glass |

| PHASE I | Intermediate action | PHASE II |
|---|---|---|
| PET-ITO - LC - PET-ITO | Adhere glasses | Glass - (PET-ITO - LC - PET-ITO) - Glass |
| PET-ITO - LC - PET-ITO | Adhere glass using retrofitting techniques | Glass - (PET-ITO - LC - PET-ITO) |

The methods of fabricating the PDLC Phase I with the configuration PET-ITO-LC-PET-ITO are known in the art.

Referring now to FIG. 1, showing one method of manufacturing the PDLC for screen projection. The method is similar to that of a regular PDLC. FIG. 1 upper side shows how the liquid crystal 10 is poured 11 between two supporting films, one can be PET (for passive)/PET-ITO (for active) 17 while the second one is a "release sheet" 18. The film passes then in the UV oven 14 and then dried in chamber 13. Rotors 15 and 16 confer the final thickness to the film, which is later rolled 19. FIG. 1 lower side shows the final film which comprises a layer of PET (for passive)/PET-ITO (for active) 17, a layer of liquid crystal 10 and the "release sheet" 18, which is then peeled away and can be replaced by a regular glass (for passive) 4 or metalized coated glass (for active) 5.

Figure 2:
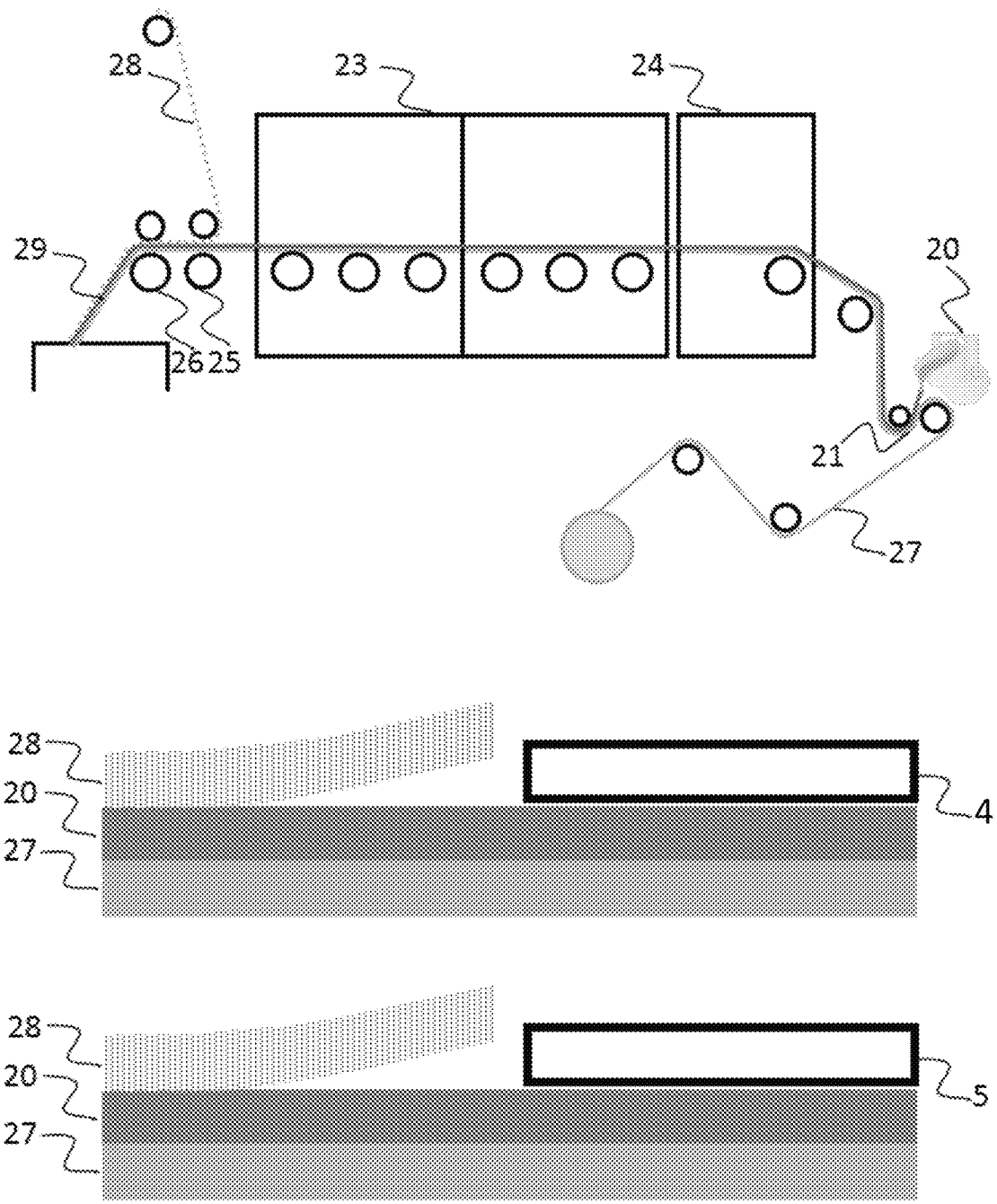
FIG. 2—showing another schematic representation of a method for manufacture the PDLC projection screen.

Referring now to FIG. 2, showing another method of manufacturing the PDLC for screen projection. The method is similar to that of a regular PDLC. FIG. 2 upper side shows how the liquid crystal 20 is poured 21 on one supporting film, it can be PET (for passive)/PET-ITO (for active) 27. The film passes then in the UV oven 24 and then dried in chamber 23. Then the second support film is attached to the film. This film is a "release sheet" 28. Rotors 25 and 26 confer the final thickness to the film, which is later rolled 29. FIG. 2 lower side shows the final film which comprises a layer of PET (for passive)/PET-ITO (for active) 27, a layer of liquid crystal 20 and the "release sheet" 28, which is then peeled away and can be replaced by a regular glass (for passive) 4 or metalized coated glass (for active) 5.

Figure 3:
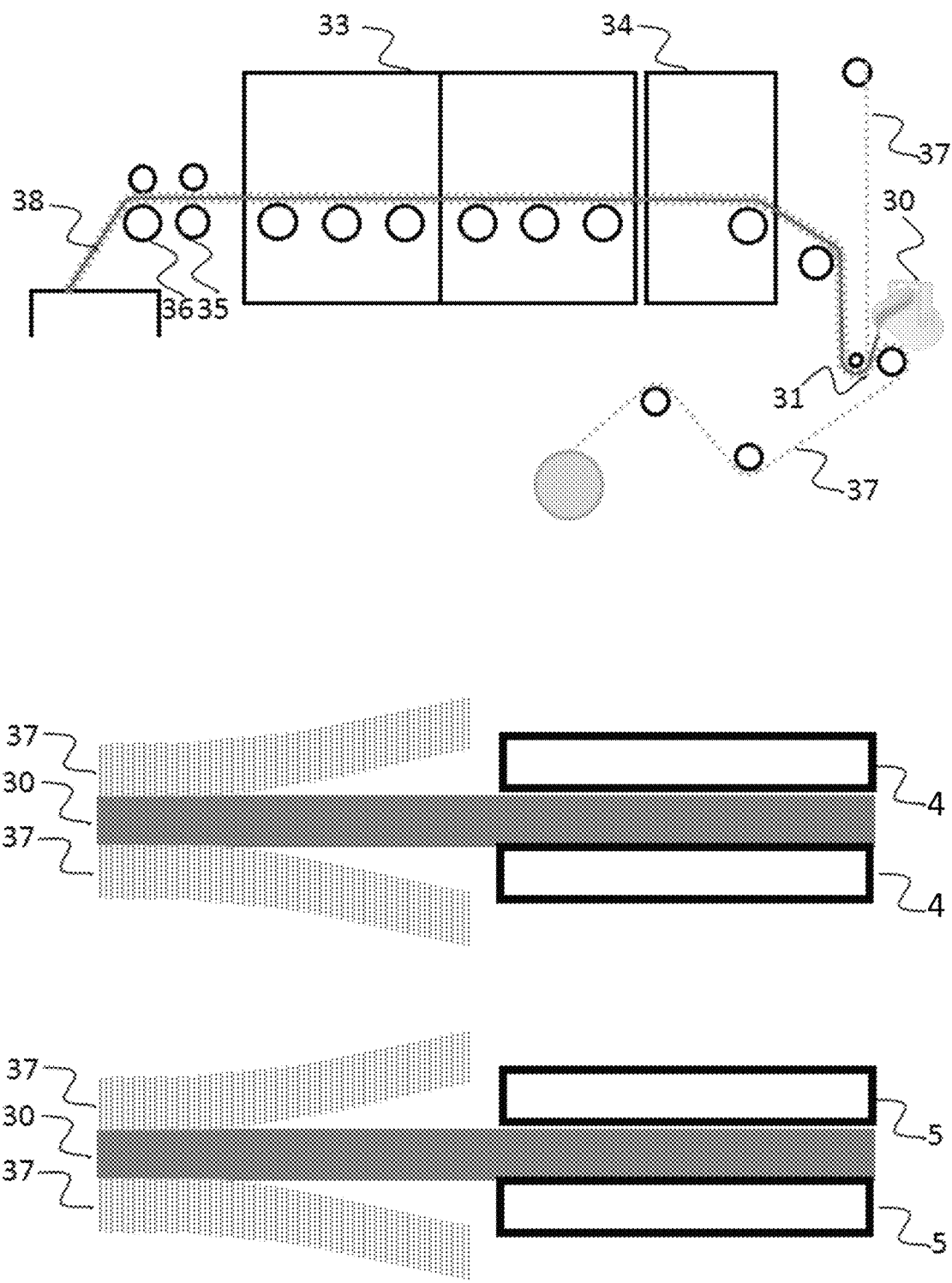
FIG. 3—showing another schematic representation of a method for manufacture the PDLC projection screen.

Referring now to FIG. 3, showing yet another method of manufacturing the PDLC for screen projection. The method is similar to that of a regular PDLC. FIG. 3 upper side shows how the liquid crystal 30 is poured 31 between two supporting films, both are "release sheet" films 37. The film passes then in the UV oven 34 and then dried in chamber 33. Rotors 35 and 36 confer the final thickness to the film, which is later rolled 38. FIG. 3 lower side shows the final film which comprises a layer of liquid crystal 30 and two "release sheets" 37, which are then peeled away and can be replaced by two regular glasses (for passive) 4 or two metalized coated glass (for active) 5.

Figure 4:
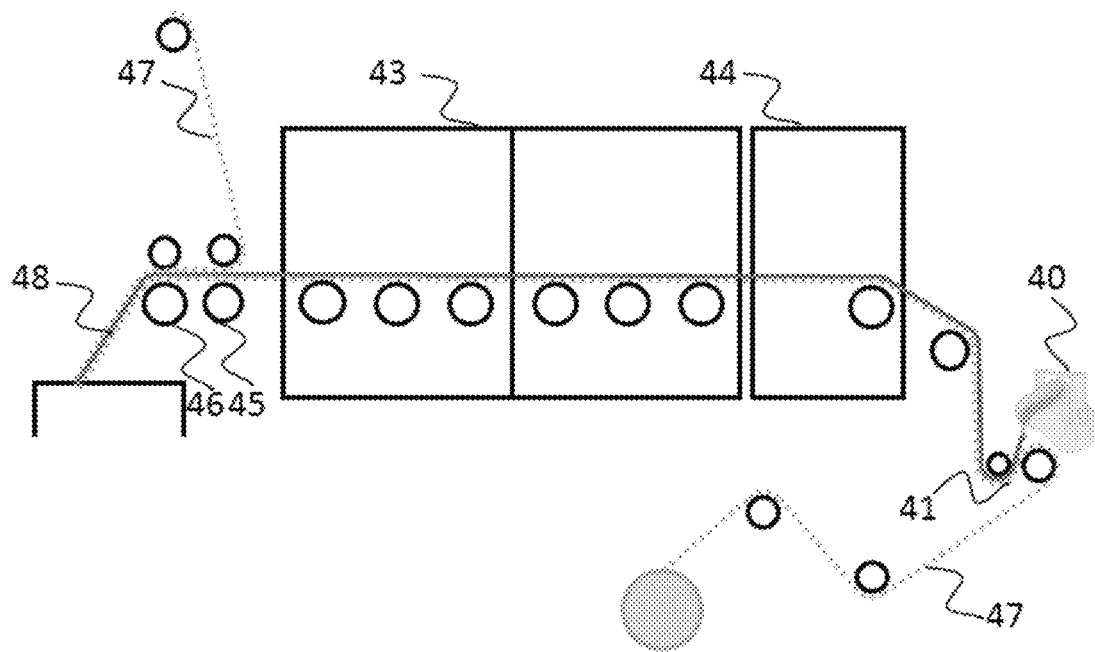
FIG. 4—showing another schematic representation of a method for manufacture the PDLC projection screen.
Figure 4:
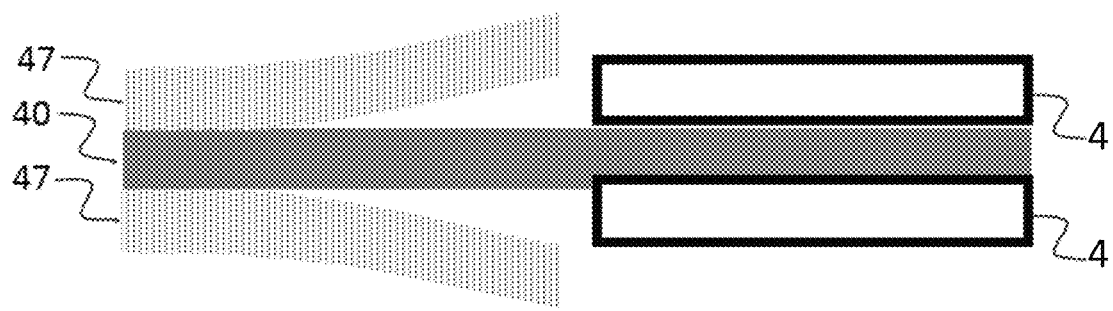
Figure 4:
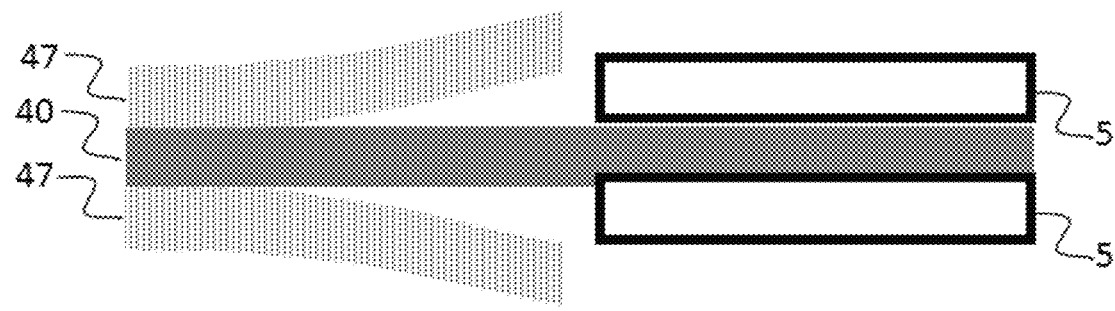

Referring now to FIG. 4, showing yet another method of manufacturing the PDLC for screen projection. The method is similar to that of a regular PDLC. FIG. 4 upper side shows how the liquid crystal 40 is poured 41 on one supporting film, which is a "release sheet" 47. The film passes then in the UV oven 44 and then dried in chamber 43. Then the second support film is attached to the film. This film is also a "releasing sheet" 47 film. Rotors 45 and 46 confer the final thickness to the film, which is later rolled 48. FIG. 4 lower side shows the final film which comprises a layer of liquid crystal 40 and two "release sheets" 47, which is then peeled away and can be replaced by two regular glasses (for passive) 4 or two metalized coated glasses (for active) 5.

Figure 5:
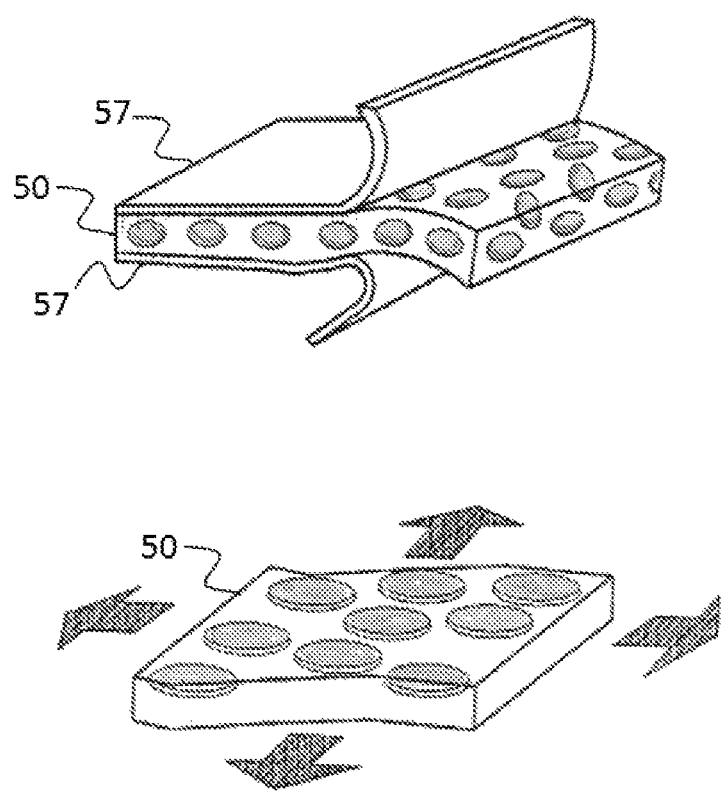
FIG. 5—showing another schematic representation of a method for manufacture the PDLC projection screen.

Referring now to FIG. 5, showing either one of the resulting films of FIGS. 3-4, which comprises a layer of liquid crystal 50 and two "releasing sheets" 57. Once the "releasing sheets" are peeled away, the remaining layer of liquid crystal 50 can be further treated with stretching and liquid crystal domain orientation.

Fabrication of Multi-Layer Projection Screens

The present invention is based on adaptation of PDLC film technology and development of a series of novel and high quality switchable and non-switchable single- and multi-layer screens for large-area rear and front projection screen applications.

Methods of how to fabricate single layer passive and active PDLC projection screens were mentioned above.

Methods of how to fabricate multi-layer passive and active PDLC projection screens are described herein:

Fabrication of Double-Layer Passive Projection Screen:
Peel-off one release from a single or double-release PDLC after Phase I.
Attach a new flexible non-metalized (i.e., PET) film support.
In-situ coating and lamination of the second PDLC layer (5-50 µm) between the first PDLC layer and the new non-metalized film support.
Complete curing of the first and second PDLC layers.

Fabrication of Triple-Layer Passive Projection Screen:
Peel-off one release from the first single or double-release PDLC after Phase I.
Peel-off one release from the second single or double-release PDLC after Phase I.
In-situ coating and lamination of a third highly adhesive PDLC layer (5-50 µm) between the first and second PDLC layers after Phase I.
Complete curing of the first, second and third PDLC layers.

Fabrication of Double-Layer Active Flexible Projection Screen:
Peel-off the release from a single-release PDLC after Phase I.
Attach a new flexible metalized (i.e., ITO-PET, etc.) film support.
In-situ coating and lamination of a second PDLC layer (5-50 microns) between the first PDLC layer after Phase I and the second metalized film support.
Complete curing of the first and second PDLC layers.

Fabrication of Triple-Layer Active Flexible Projection Screen:
Peel-off the release from the first single-release PDLC after Phase I.
Peel-off the release from the second single-release PDLC after Phase I.
In-situ coating and lamination of a third highly adhesive PDLC layer (5-50 µm) between the first and second PDLC layers after Phase I.
Complete curing of the first, second and third PDLC layers.

Flexible Screen Vs. Rigid Screens

All the PDLC projection screens, whether they are active or passive can be manufactured as rigid screens of flexible screens.

The main difference between the two is the final step of Phase II, where in the case of a rigid screen there is a step of lamination of the cured PDLC layer onto a rigid (glass, polycarbonate, Plexiglas, etc.) non-metalized (for passive)/metalized (for active) support. In contrast, in the case of a flexible screen there is a step of In-situ coating and laminating and complete processing of highly-adhesive PDLC layer (10-50 µm) between two non-metalized (for passive)/metalized (for active) film supports.

In a preferred embodiment, the multilayer PDLC, LCDP, PSLC, polymer network film or PDLC projection screen can be enclosed between two glasses or may be retrofitted on existing interior and exterior architectural glazing, automotive windows, and other interior glazing. A transparent adhesive may be used to stick the panel to the window, which may be integrated with the panel or separately provided. The panel may also be applied to original windows before installation.

EXAMPLES

Example 1

PDLC projection screens were manufactured as mentioned above. Performance of said screens was measured in accordance with either ASTM D1003-13, ISO 13468-1:1996 or ISO 13468-2:1999. The results of said measurements are as follows:
  Total light transmittance $T_t$ of about 70 to 90%
  Diffusion transmittance $D_t$ of about 0 to 10%
  Clarity C of 90 to 97%
  Haze value H of about 0 to 3%, Therefore, it is a scope of the present invention to provide passive or active PDLC projection screen, in either rigid or flexible form, having a total light transmittance $T_t$ of about 70 to 90%, a diffusion transmittance $D_t$ of about 0 to 10%, a clarity C of 90 to 97% and a haze value H of about 0 to 3%, measured in accordance with either ASTM D1003-13, ISO 13468-1:1996 or ISO 13468-2:1999.

Example 2

In one embodiment of the present invention, the PDLC can be activated or deactivated in order to "allow" the images screened on it to be seen or not. This example works great on stores showcases. The projection screen, couples to a motion sensor, can show the image that is screened, and once potential clientele approaches and the sensors are activated, the projection screen becomes transparent allowing the person or persons to look inside the showcase.

Example 3

Opposite to example 2, the coupling of a motion sensor to the PDLC projection screen can be used for energy saving. The projection screen is transparent and not in use. Once the sensor is activated by a person walking by, the projection screen is activated, becomes opaque and the screened images will be seen.

Example 4

Using the same principle, the PDLC projection screen can be activated or deactivated when needed or not. When is not needed, the PDLC projection screen can be transparent, and when it is needed, the PDLC projection screen becomes opaque and the projection can begin.

Example 5

Transparency (or opacity) of the PDLC projection screen can be automatically controlled using the specialized dimmer created by Gauzy. The dimmer is a power dimmer apparatus operative to provide AC current to said t PDLC projection screen to generate a set of transparency states between opaque and full transparent. Therefore, the dimmer allows the complete control of the activation level of the PDLC projection screen. From completely opaque, to a variety of transparency states, to a completely transparent PDLC projection screen. This open a wide spectrum of applications for the PDLC projection screen of the present invention. Applications that can only be possible using the specifics of the present invention.

In several embodiments of the present invention, said PDLC projection screen is further connected to at least one sensor selected from group consisting of: movement sensor, temperature sensor, location sensor, humidity sensor, light sensor, and any combination thereof.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A PDLC projection screen, consisting of:
  at least two transparent polymer supports;
  at least one layer of liquid crystal dispersions located between said at least two transparent polymer supports; and,
  electrical components to control the behavior of said PDLC projection screen;
wherein said at least one layer of liquid crystal dispersions is characterized by a thickness of 30-100 μm.

2. The PDLC projection screen of claim 1, wherein said at least two transparent polymer supports are metalized coated.

3. The PDLC projection screen of claim 1, wherein said at least two transparent polymer supports are non-metalized coated.

4. The PDLC projection screen of claim 1, wherein said at least one layer of liquid crystal dispersions comprises droplets selected from the group consisting of nano-droplets, micro-droplets, macro-droplets, liquid crystal inclusions dispersed in a polymer matrix, and any combination thereof.

5. The PDLC projection screen of claim 1, wherein said transparent polymer supports are flexible.

6. The PDLC projection screen of claim 1, wherein at least one of the following is true:
  said transparent polymer supports comprise flexible non-metalized supports made of PET; and,
  said transparent polymer supports comprise rigid metalized supports made of a material selected from the group consisting of polycarbonate, Plexiglas, and glass.

7. The PDLC projection screen of claim 1, wherein said PDLC projection screen comprises at least one PDLC layer with different droplet morphologies.

8. The PDLC projection screen of claim 1, wherein said PDLC projection screen is connected to a power dimmer apparatus operative to provide AC current to said PDLC projection screen to generate a set of transparency states between opaque and full transparent.

9. A method for presenting a projected image, comprising:
  acquiring the PDLC projection screen of claim 1;
  acquiring a projector;
  placing said projector in a location selected from the group consisting of in front of said PDLC projection screen and behind said PDLC projection screen;

activating said projector; and,
either activating or deactivating said PDLC projection screen.

10. The method of claim 9, comprising connecting said PDLC projection to a power dimmer apparatus operative to provide AC current to said PDLC projection screen, thereby providing transparency states ranging between opaque and full transparent.

11. The method of claim 9, comprising connecting said PDLC to at least one sensor selected from the group consisting of movement sensors, temperature sensors, location sensors, humidity sensors, and light sensors.

12. The PDLC projection screen of claim 1, wherein said transparent polymer supports are rigid.

13. The PDLC projection screen of claim 1, wherein said at least one layer of liquid crystal dispersions is characterized by a monodispersed morphology.

14. A method for manufacturing a PDLC projection screen, consisting of:
 providing materials for producing a PDLC film, said materials comprising:
  at least two transparent polymer supports; and
  at least one liquid crystal dispersion;
 disposing said liquid crystal dispersion between said at least two transparent polymer supports, thereby forming a PDLC film;
 curing said PDLC film by means of UV light, electron beam light or heat; and,
 controlling the quality parameters of said PDLC projection screen;
wherein:
 said step of disposing said liquid crystal dispersion between said at least two transparent polymer supports comprises disposing said liquid crystal dispersion to a thickness of 30-100 μm; and,
 said step of controlling the quality parameters of said PDLC projection screen further comprises a step of verifying that said quality parameters are equal to: a total light transmittance $T_t$ of about 70 to 90%, a diffusion transmittance $D_t$ of about 0 to 10%, a clarity C of 90 to 97%, and a haze value H of about 0 to 3%, measured in accordance with either ASTM D1003-13, ISO 13468-1:1996 or ISO 13468-2:1999.

15. The method of claim 14, wherein said step of providing materials for producing a PDLC film comprises providing at least two metallized coated transparent polymer supports.

16. The method of claim 14, wherein said step of providing materials for producing a PDLC film comprises providing at least two non-metallized coated transparent polymer supports.

17. The method of claim 14, wherein said step of providing at least one liquid crystal dispersion comprises providing at least one liquid crystal dispersion that is characterized by a monodisperse morphology.

18. A method for manufacturing a multilayer of liquid crystal dispersion in a polymer matrix film adapted for a PDLC projection screen, consisting of:
 providing materials for producing a PDLC film, comprising:
  at least one first releasable supporting film;
  at least one liquid crystal dispersion;
  at least one second supporting film;
 disposing said liquid crystal dispersion between said at least one first releasable supporting film and said at least one second supporting film, thereby forming a PDLC film;
 curing said PDLC film by means of UV light, electron beam light or heat;
 detaching said at least one releasable supporting film;
 providing materials for producing at least one second layer of liquid crystal in said PDLC film, comprising:
  a third supporting film;
  a second liquid crystal dispersion;
 disposing said second liquid crystal dispersion between said third supporting film and said PDLC film, thereby forming a multilayer PDLC film;
 curing said multilayer PDLC film by means of UV or electron beam light; and
 controlling the quality parameters of said PDLC projection screen;
wherein:
 any of said supporting films can be releasable supporting films;
 said steps of disposing said liquid crystal dispersion between said at least one first releasable supporting film and said at least one second supporting film and of disposing said second liquid crystal dispersion between said third supporting film and said PDLC film comprise disposing said liquid crystal dispersions to a total thickness of 30-100 μm; and,
 said step of controlling the quality parameters of said PDLC projection screen further comprises a step of verifying that said quality parameters are equal to: a total light transmittance $T_t$ of about 70 to 90%, a diffusion transmittance $D_t$ of about 0 to 10%, a clarity C of 90 to 97%, and a haze value H of about 0 to 3%, measured in accordance with either ASTM D1003-13, ISO 13468-1:1996 or ISO 13468-2:1999.

19. The method of claim 18, wherein said step of providing materials for producing a PDLC film comprises providing at least two transparent metallized coated transparent polymer supports.

20. The method of claim 18, wherein said step of providing materials for producing a PDLC film comprises providing at least two transparent non-metallized coated transparent polymer supports.

21. The method of claim 18, wherein said step of providing at least one liquid crystal dispersion comprises providing at least one liquid crystal dispersion that is characterized by a monodisperse morphology.

\* \* \* \* \*